July 21, 1931.   H. MORAZ   1,815,208
CINEMATOGRAPHIC DEVICE
Filed March 11, 1927    2 Sheets-Sheet 1
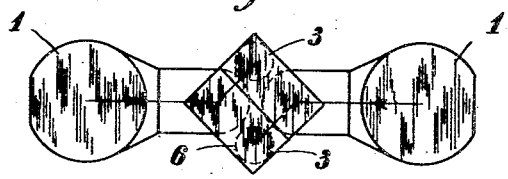
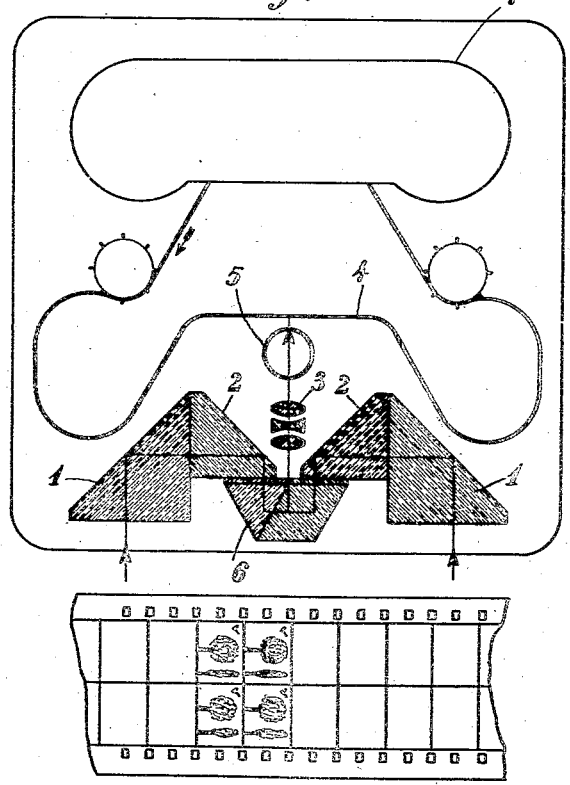

July 21, 1931.  H. MORAZ  1,815,208
CINEMATOGRAPHIC DEVICE
Filed March 11, 1927   2 Sheets-Sheet 2

H. Moraz
INVENTOR
By: Marks & Clerc
Attys.

Patented July 21, 1931

1,815,208

UNITED STATES PATENT OFFICE

HENRI MORAZ, OF THOUNE, SWITZERLAND

CINEMATOGRAPHIC DEVICE

Application filed March 11, 1927, Serial No. 174,645, and in Switzerland March 12, 1926.

The present invention relates to a stereoscopic cinematographic camera in which the pictures can directly serve as images or for projecting purposes.

With the ordinary taking means of stereoscopic pictures when the negative is viewed from the film side the left hand picture is on the left and the righ hand picture is on the right as it ought to be for the stereoscope but in each single picture "left" and "right" is misplaced. If such a negative is transformed by a reverting process into a positive and viewed from the back side the right and left in each single picture are in their correct position but the single pictures are now misplaced and this will ever remain so unless the two pictures are cut apart and have changed place. But this is a wearisome process.

In order to avoid this according to the present invention the objectives of the camera are located behind the prisms one above the other. This arrangement alone combined with the horizontal arrangement of the taking film allows to meet difficulties which hitherto have been met with the taking and reproducing of stereo-images.

It has already been proposed to place the objectives behind the prisms and also the horizontal arrangement of the moving film is not new, but new is the combination of these two features with the convenient addition prisms. This combination affords the possibility of producing correct stereoscopic copies.

In the accompanying drawings one working example of the object of the invention is represented.

Figs. 1 and 2 represent a front view and a horizontal diagrammatical section.

Fig. 3 shows the size and arrangement of the images on a film which was lighted with an optical device according to Figs. 1 and 2.

Figure 4:
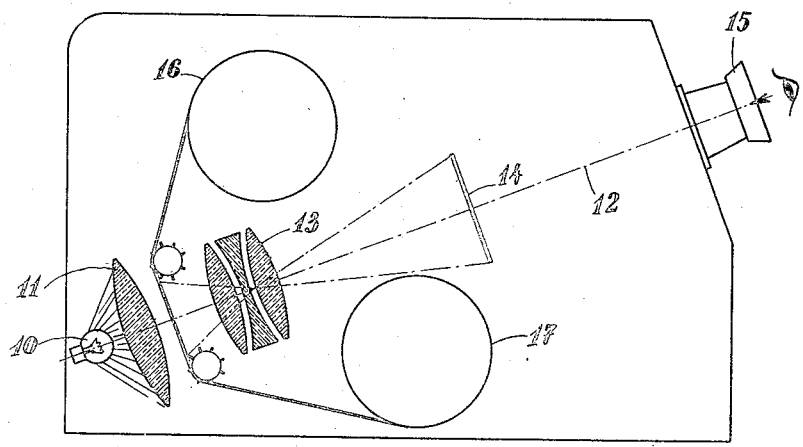
Figs. 4 and 5 show diagrammatically a camera for viewing the images which were produced by the camera according to Figs. 1 and 2.

The reflecting prisms are designated with 1 and 2 and the objectives arranged behind these prisms and one above the other are designated with 3, the film is marked with 4 and the diaghragms with 5. Between the prisms 2 and the objectives 3 an additional prism 6 is inserted, which deflects the two luminous rays arranged at first horizontally one beside the other after their passage through the prisms 1 and 2 into a vertical plane containing the axes of the objectives 3, 3. Thus the single images have been brought one above the other, that is, they have been turned by 90° and the objectives are placed one above the other in order to have the images on the film arranged as shown in Fig. 3. It is evident that the path of the rays instead of being directed from the left side downwards could also be directed from the left side upwards by turning the additional prism for 90°. All liberty is left to adapt the position of the images according to the direction of the moving film.

This optical arrangement permits of a horizontal guiding of the film and therefore the exterior appearance of the camera will not differ from the usual stereoscopic camera. No parts projecting to the outside are to be seen and the apparatus is employed like an ordinary stereoscopic camera.

The film 4 is moved by means not represented at half the speed of an ordinary film. It leaves the casing 7 in order to return again to it after having stopped before the objectives. This arrangement allows to employ the total height of the film for two images side by side. Thereby the bulk of the camera is greatly reduced. It would be much increased, if the film should move vertically, that is perpendicularly to the plane of the axes of the prisms.

The two images are reproduced on the film in such a position that they can be viewed without any reversing with an ordinary stereoscopic viewing device.

Figure 5:
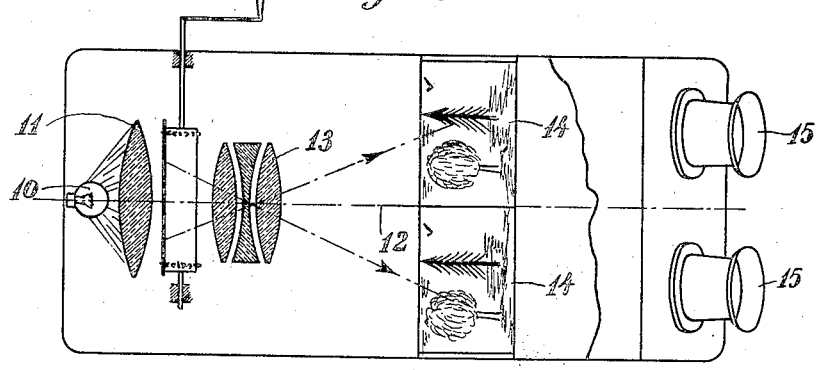

It is not absolutely necessary to make the projecting for each image singly. The projecting can be made as indicated in the Figures 4 and 5 by means of a lamp 10 the rays of which are thrown by a condenser 11 simultaneously on both images arranged on both sides of the axis 12 in Fig. 5.

An optical device 13 of a known combination projects these images on to a ground glass plate 14 where they can be viewed by means of a stereoscopic system 15. The film unrolls from the bobbin 16 and on to roll 17. The combination of the two images on the film is therefore so, that for reproducing the same it is not necessary to operate with a complicated optical device and not necessary to separate the left hand images from the right hand images in order to treat each row separately and to arrange the same correctly side to side.

What I claim as new is:

In a stereo-cinematographic camera and in combination a pair of spaced reflecting prisms arranged to receive the rays right angularly on one of the faces and to reflect the rays right towards the space between the prisms, a second pair of right reflecting prisms between the first pair to reflect the received images backwards, and a right reflecting prism adjacent to the back of the second pair of prisms and turned obliquely to bring the received images one above the other, two objectives arranged to receive the images from the oblique prism and means adapted to move a film perpendicularly to the plane of the rays of the objectives, the whole arrangement for the purpose of transmitting the true position of right and left in the received negative images to the positive images appearing on the film.

In testimony whereof I affix my signature.

HENRI MORAZ.